United States Patent [19]

Tanaka et al.

[11] 4,275,456

[45] Jun. 23, 1981

[54] BETTING TICKETS SELLING AND COLLECTING SYSTEM

[75] Inventors: Takehiko Tanaka; Yoji Kubota, both of Kawasaki; Kiyoshi Kubomura, Yokohama, all of Japan

[73] Assignee: Fujitsu Limited, Tokyo, Japan

[21] Appl. No.: 64,912

[22] Filed: Aug. 8, 1979

[30] Foreign Application Priority Data

Aug. 16, 1978 [JP] Japan ................................ 53-99628

[51] Int. Cl.[3] ...................... G06F 11/00; G06F 15/02; G06F 15/28

[52] U.S. Cl. .................................................. 364/900

[58] Field of Search ... 364/200 MS File, 900 MS File; 235/419

[56] References Cited

U.S. PATENT DOCUMENTS

| | | | |
|---|---|---|---|
| 3,252,149 | 5/1966 | Weida et al. | 364/200 |
| 3,505,646 | 4/1970 | Affel, Jr. et al. | 364/200 |
| 3,516,068 | 6/1970 | Howard et al. | 364/900 |
| 3,533,084 | 10/1970 | Cook et al. | 364/200 |
| 4,032,946 | 6/1977 | Wakatsuki et al. | 364/900 |
| 4,096,560 | 6/1978 | Footh | 364/200 |
| 4,133,042 | 1/1979 | Wallace | 364/900 |

*Primary Examiner*—Harvey E. Springborn
*Attorney, Agent, or Firm*—Staas & Halsey

[57] ABSTRACT

In a ticket selling and collecting system wherein a plurality of apparatus for selling betting tickets are connected in parallel to the data collecting apparatus, a memory which stores the latest ticket selling data which has been sent to the apparatus for selling betting tickets is provided in the data collecting apparatus. If a power failure occurs in the apparatus for selling betting tickets and thereafter power is restored the apparatus for selling betting tickets sends a message for requesting the latest ticket selling data to the data collecting apparatus and receives the latest ticket selling data from the memory of the data collecting apparatus, thereby the ticket selling information which has been invalidated by the power failure generated at the time of ticket selling can be reproduced accurately in the apparatus for selling betting tickets. Thus, the operator's burden due to power failure in the apparatus for selling betting tickets can be alleviated and an accurate collection file can be maintained.

8 Claims, 7 Drawing Figures

FIG. 1. PRIOR ART
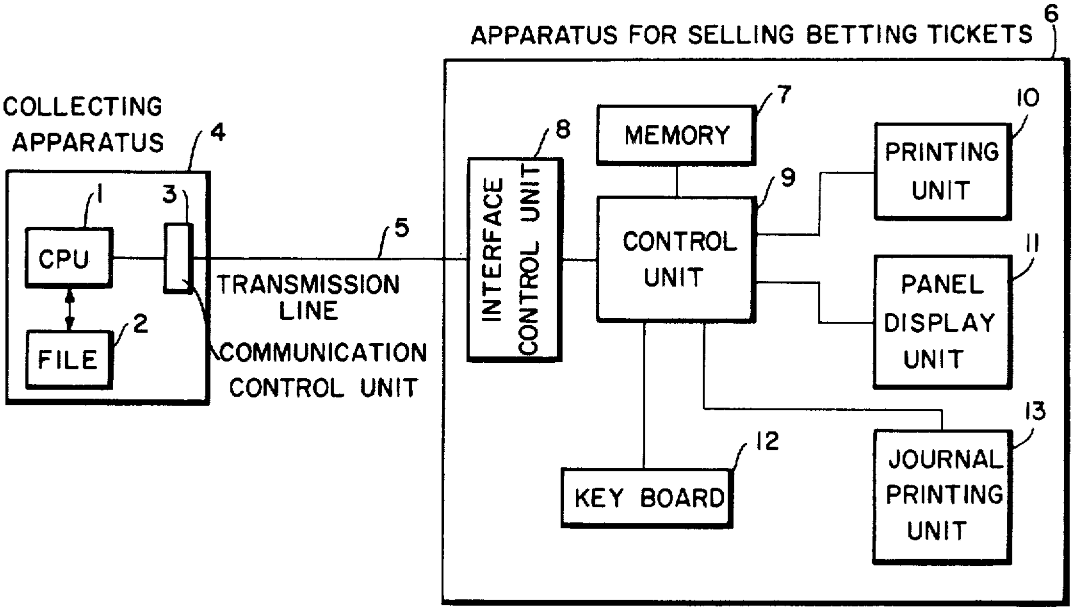
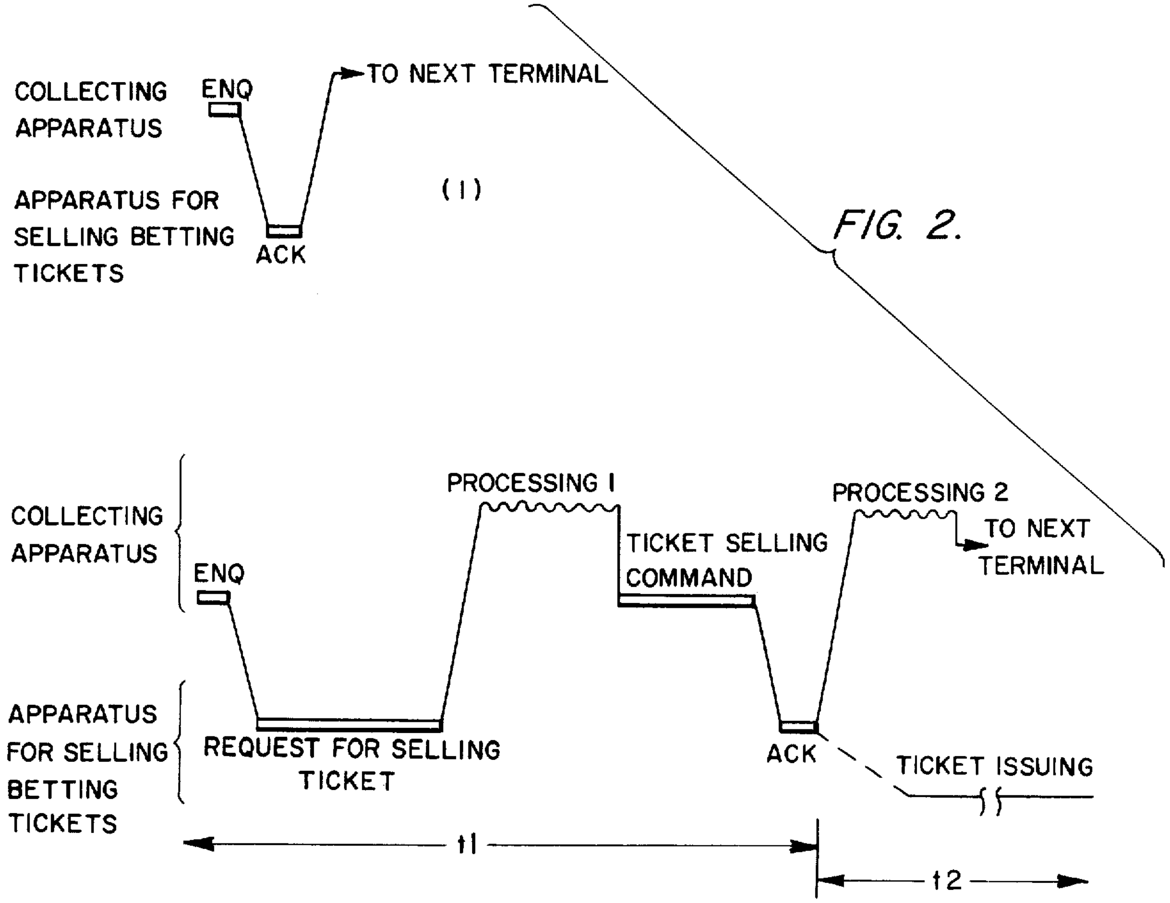
FIG. 2.

BETTING TICKETS SELLING AND COLLECTING SYSTEM

BACKGROUND OF THE INVENTION

This invention relates to a data processing system for compensating for a power failure in an apparatus for selling betting tickets in a ticket selling and collecting system.

This invention relates to U.S. Pat. No. 4,032,946 by Yuzo Wakatuki, Masanobu Miyake, Kazuyuki Hano issued June 28, 1977 and U.S. Pat. No. 4,108,364 by Takehiko Tanaka, Yuzo Wakatsuki, Toshio Niiya issued Aug. 22, 1978.

In the case of horse races and cycle races, the so called ticket selling and betting job is essential, wherein the betting tickets are sold to audiences and repayment is made to those having winning tickets. The computerized system for such jobs is called a totalizator system, which is composed of a large amount of terminal equipment (hereinafter referred to as apparatus for selling betting tickets) for selling betting tickets and a small amount of ticket collecting apparatus. In the totalizator system, the number of tickets sold must be accurately counted, the, amount of money bet on the same number, the money sum of all the betting tickets and the amount of repayment for the winning tickets must be quickly and accurately calculated. If the number or amount of tickets is miscounted the repayment of the winning tickets also becomes incorrect. As a result, the promotor pays more or less money than the correct amount and the reliability of the system drastically deteriorates.

Therefore, the totalizator is always required to correctly and stably operate even if there are many external disturbances.

The most serious external disturbance is power failure. In present electronics technology it is easy to stably and correctly operate a system which is designed on the basis of a specified power supply voltage, so long as the specified voltage and frequency are supplied from the power supply system. However, if the system power supply voltage drops while the system is operating, the system of course stops operating and temporarily falls into an unstable state.

If the system breaks down, the races can no longer be continued. Therefore in some cases a non-breaking power supply system is provided for the totalization system. But in some cases such a system can not be provided mainly because of economical reasons.

In such a case, since temporary suspension of the job due to power failure is inevitable, it is essential that the system be able to start operating again immediately after the power supply is restored.

Generally, if power failure or trouble occurs in the computer system or a part of it, operation can easily be reinstated by initialization of the operating process when such trouble occurs.

However in the case of the totalizator system, it is almost impossible to recollect the betting tickets once they are sold. For this reason, if power failure occurs, it is necessary to freeze the state of the system at the moment such power failure occurs and to restart the operation accurately from that state when the power supply is restored.

Such control is sufficiently possible in the closed loop of the electronics.

Namely, the occurrence of power failure is detected by an external signal, every operation is suspended at a time, and every state at this time is stored in the nonvolatile memory. When the power failure is repaired operation can be started again from the point where the power failure occurred.

However, in a large scale system such as a totalizator system, many apparatuses for selling betting tickets are connected to the system and are operated in parallel. Therefore the totalizator system requires special controls.

Data handling between the apparatus for selling betting tickets and the collecting apparatus will be explained by referring to FIG. 1 and FIG. 2.

In these figures, 1 is the CPU (Central Processing Unit), 2 is the collecting file, 3 is the communication control unit, 4 is the collecting apparatus, 5 is the transmission line, 6 is the apparatus for selling betting tickets, 7 is the memory, 8 is the interface control unit, 9 is the control unit, 10 is the ticket printing unit, 11 is the panel display unit, 12 is the keyboard and 13 is the journal printing unit.

A drawing illustrating the apparatus for selling betting tickets is shown in FIG. 2 of U.S. Pat. No. 4,032,946 and U.S. Pat. No. 4,108,364, and the overall block diagram is illustrated in FIG. 4 and FIG. 5 of U.S. Pat. No. 4,032,946 and in FIG. 4 of U.S. Pat. No. 4,108,364. The ticket printing unit is shown in FIG. 6 of U.S. Pat. No. 4,032,946, while the panel display unit and keyboard are shown in FIG. 3 of U.S. Pat. No. 4,032,946 and U.S. Pat. No. 4,108,364. An example of the printed betting tickets is shown in FIG. 1 and FIG. 7 of U.S. Pat. No. 4,032,946 and in FIG. 1 of the U.S. Pat. No. 4,108,364. Therefore, a detailed explanation is unnecessary.

FIG. 2 (1) shows the operating time chart where there is no request for ticket selling to the apparatus for selling betting tickets.

When a message "ENQ" is sent to the apparatus for selling betting tickets 6 from the collecting apparatus 4 by the polling system, enquiring as to a request for ticket selling, this signal is transmitted to the interface control unit 8 of the apparatus for selling betting tickets via the transmission line 5 and is then sent to the control unit 9.

The control unit 9 returns the message "ACK" to the collecting apparatus 4 via the interface control unit 8 and transmission line 5. The message "ACK" means there have been requests for ticket selling.

The collecting apparatus 4 decodes this "ACK" message and then polling is transferred to the next apparatus for selling betting tickets.

FIG. 2 (2) shows the operating time chart where a request for ticket selling is issued to the apparatus for selling betting tickets 6. The operations of the apparatus for selling betting tickets 6 and collecting apparatus 4 in this case will now be explained.

1 The operator inputs the betting data given from a bettor to the apparatus for selling betting tickets 6 from the keyboard 12. The betting data is stored in the memory 7 via the control unit 9 within the apparatus for selling betting tickets and simultaneously displayed on the panel display unit 11.

2 When all betting data of a bettor is input, the operator presses the "SEND" key which is not illustrated.

3 After receiving the message "ENQ" which is sent from the collecting apparatus, the apparatus for selling betting tickets sends the message indicating requested ticket selling and betting data stored in the memory 7 to the collecting apparatus 4 via the control unit 9, interface control unit 8 and transmission line 5.

4 The abovementioned betting data are sent to the CPU 1 via the communication control unit 3 of the data collecting apparatus 4. This betting data is checked to see whether or not ticket selling should be allowed. This is processing 1.

5 Upon completion of the above processing, the CPU 1 returns the answer to the apparatus for selling betting tickets using a ticket selling allowing signal.

6 Upon receiving the ticket selling allowing signal, the control unit 9 of the apparatus for selling betting tickets 6 returns the "ACK" signal to the data collecting apparatus.

7 Then, the control unit 9 of the apparatus for selling betting tickets issues a command for starting ticket selling. Thus, the ticket selling data being stored in the memory 7 is sent to the printing unit 10, printing the data on the ticket and simultaneously the spare ticket is also printed by the journal printing unit 13.

8 The betting ticket is issued.

9 After receiving the message "ACK" from the apparatus for selling betting tickets 6, the collecting apparatus 4 knows that the ticket selling command is received by the apparatus for selling betting tickets 6 and updates the contents of collecting file 2 in the collecting apparatus 4 in accordance with the abovementioned betting ticket data. This is processing 2. Upon completion of processing 2, the polling for the next apparatus for selling betting tickets is performed. Here, the time of ticket selling operation is important. Usually, the ticket selling operation takes a time from several hundred milliseconds to two seconds because it is a mechanical operation. Essentially, the collecting file should be updated after completion of the ticket selling operation. But it makes the processing speed of the CPU slow. Thus, the file is updated when it is confirmed that the apparatus for selling betting tickets has received the data. Thereafter, although it is inevitable, as many apparatus for selling betting tickets is expected to sell the tickets as are updated in the file. As an alternative method, data could be sent to the CPU when the apparatus for selling betting tickets completes a cycle of operation. But this deteriorates efficiency because repeated CPU service is required.

Next the occurrence of the timing of power failure in the apparatus for selling betting tickets is considered in a series of sequence shown in FIG. 2 (2). t1 is the timing until the apparatus for selling betting tickets and the collecting apparatus agree on the ticket selling contract. If a power failure occurs during this timing, there is no inconsistency between these apparatus because the collecting apparatus does not update the file and the apparatus for selling betting tickets does not sell tickets. However, if a power failure occurs during the timing t2, ticket selling of the apparatus for selling betting tickets becomes disabled and file updating the collecting apparatus is completed. Therefore, if the power failure occurs during the timing t2, this error must be corrected after restoration of the power supply. Here, a correcting method is necessary. If power failure occurs during the timing t2, the ticket may be in any of the following condition: it entirely disappears, it is imperfectly printed or it is printed but is not appearing from the ticket outlet and remains on the inside. However, if such tickets are all to be wasted, no difference between the file contents and number of tickets sold occurs if these tickets are subtracted from the file and the ticket selling job is restarted. Next, the problem of what kind of data should be subtracted will be considered. In the conventional method, the data which has been handled by the operator is estimated from the imperfectly printed betting tickets or form journals (spare tickets), or the data to be subtracted on the basis of the operator's memory is sent to the collecting apparatus and then it is subtracted from the file of collecting apparatus. However, such a method has the disadvantage that it is likely to result in mistakes.

SUMMARY OF THE INVENTION

It is an object of the present invention to provide a betting ticket selling and collecting system which assures accurate file collection.

It is another object of the present invention to provide a betting ticket selling and collecting system which is capable of the operator's task when power failure occurs in the apparatus for selling betting tickets.

In order to attain these objects, the present invention accurately realizes reproduction of ticket selling data by the following process. Namely, a memory, corresponding to the memory for storing the latest ticket selling data for the apparatus for selling betting tickets, is provided in the collecting apparatus. The memory has storage areas corresponding to each apparatus for selling betting tickets; in case a power failure occurs in the apparatus for selling betting tickets and thereafter power is restored, the message requesting the latest ticket selling data is sent to the collecting apparatus when an operator of the apparatus for selling betting tickets depresses the latest ticket selling data request key (or automatically when power supply recovers), the latest ticket selling data is received from said memory. Thereby the ticket selling data which has been invalidated due to power failure occurring during ticket selling can be reproduced accurately at the apparatus for selling betting tickets as mentioned above.

The structure and effect of the present invention will become apparent from the embodiment explained in detail by referring to the attached drawings.

BRIEF DESCRIPTION OF THE DRAWINGS

FIG. 1 is a block diagram of a conventional collecting apparatus and apparatus for selling betting tickets.

FIG. 2 is a time chart indicating the data transfer sequence between the collecting apparatus and the apparatus for selling betting tickets shown in FIG. 1.

DETAILED DESCRIPTION OF THE PREFERRED EMBODIMENTS

Figure 3:
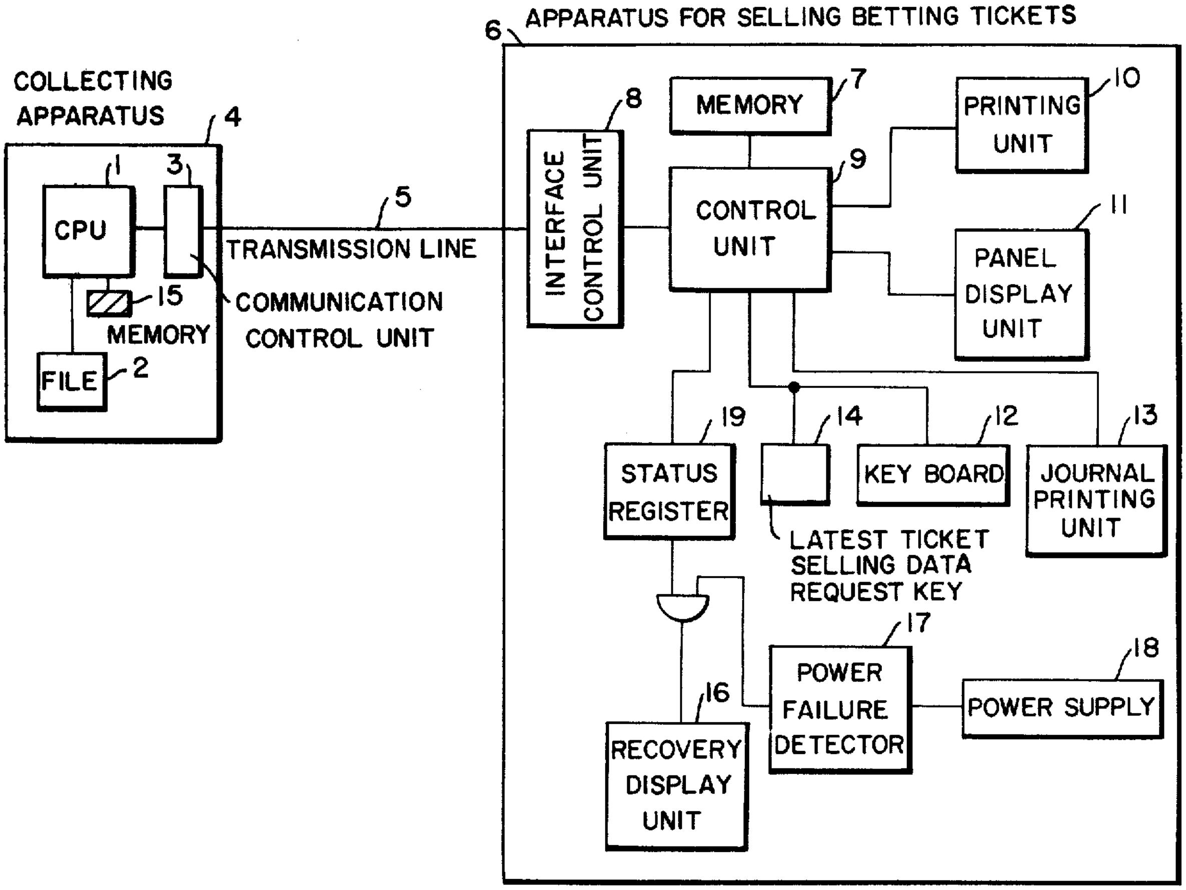
FIG. 3 is the block diagram of an apparatus for selling betting tickets according to a 1st embodiment of the present invention.

FIG. 3 shows the block diagram of an apparatus for selling betting tickets according to the 1st embodiment of the present invention.

In this figure, 14 is the latest ticket selling data request key; 15 is the latest ticket selling data memory; 16 is the recovery display unit; 17 is the power failure detector; 18 is the power supply and 19 is the status register.

Elements given the same numbering as in FIG. 1 denote the same part. The normal operation sequence of the apparatus for selling betting tickets has already been explained with reference to FIG. 1 and FIG. 2.

Next, operation of the apparatus for selling betting tickets when power failure occurs will be explained with reference to the embodiments of the present invention.

As described previously, it is when power failure occurs in the apparatus for selling betting tickets during the timing t2 that the operator must perform the subtraction processing after restoration of power. As an example of the method of showing power failure, it is enough if there is a device for memorizing the occurrence of power failure in the midst of timing t2 and for displaying it. For example, a display with a nonvolatile memory can be employed. (In the present invention, the recovery display 16 is used.)

The collecting apparatus 4 provides the latest ticket selling data memory 15 which stores the latest ticket selling command data from each apparatus for selling betting tickets.

During the timing of processing 2 in the time chart of FIG. 2 (2), the CPU 1 of the collecting apparatus 4 updates the collecting file and simultaneously stores the latest ticket selling data in the area of the latest ticket selling data memory 15 corresponding to each apparatus for selling betting tickets.

If power failure occurs during operation of the apparatus for selling betting tickets 6, the power failure detector 17 detects it. The operating condition of the apparatus for selling betting tickets 6 is sequentially output to the status register 19 by the controller 9. When the power failure detector 17 detects power failure of the apparatus for selling betting tickets 6, the contents of the status register 19 at that moment are visually displayed on the recovery display unit 16. The recovery display unit 16 indicates the operating condition of the apparatus for selling betting tickets 6 at the moment power failure occurs.

When the operator knows that power has been restored, because of the pilot lamp on the panel display 11, he depresses the latest ticket selling data request key 14 when subtraction processing is required, observing the recovery display unit 16.

Figure 4:
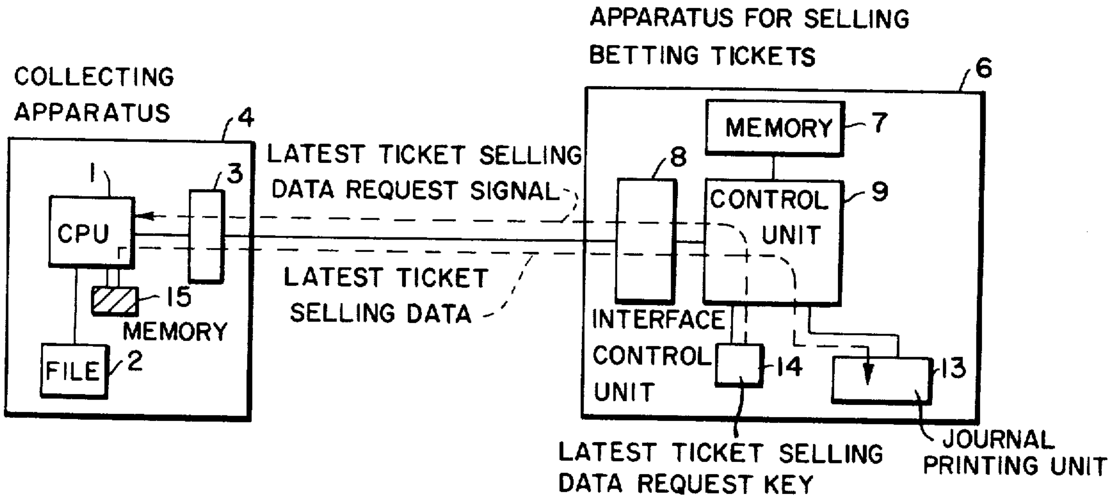
FIG. 4 illustrates the flow of data between the apparatus for selling betting tickets and the collecting apparatus at the time when power supply recovers.
Figure 5:
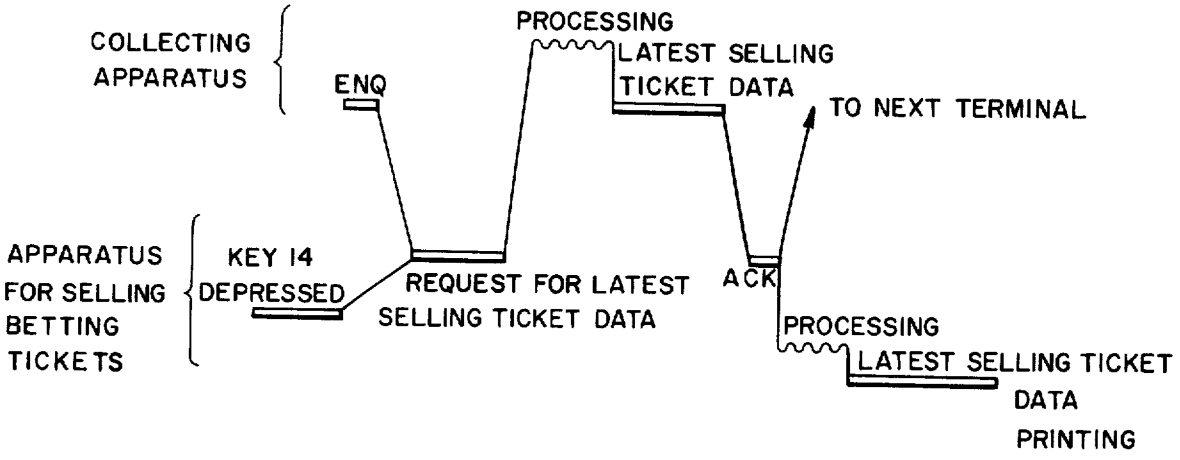
FIG. 5 is a time chart indicating the data transfer sequence between the collecting apparatus and the apparatus for selling betting tickets shown in FIG. 3.

When the latest ticket selling data request key 14 is depressed, the signal from the latest ticket selling data request key 14 is input to the control unit 9 as shown in FIG. 4 and in the time chart of FIG. 5, and therein it is converted to the latest ticket selling data request signal and sent to the collecting apparatus 4 via the transmission line 5. When the CPU 1 of the collecting apparatus 4 receives this latest ticket selling data request signal, the latest ticket selling data of the relevant apparatus for selling betting tickets is extracted from the latest ticket selling data memory 15 and is sent to the apparatus for selling betting tickets 6. The apparatus for selling betting tickets outputs the latest ticket selling data received from the collecting apparatus 4 to the journal printing unit 13 via the control unit 9 for journal printing.

The operator confirms the data printed on the journal and then if subtraction of file is required judging from this data he inputs the latest ticket selling data which has become invalid due to power failure and subtraction command signal from the keyboard 12 and sends it to the collecting apparatus 4. Thus the CPU 1 performs subtraction processing for the collecting file 2.

The betting tickets imperfectly printed due to power failure during ticket selling should all be thrown away.

Figure 6:
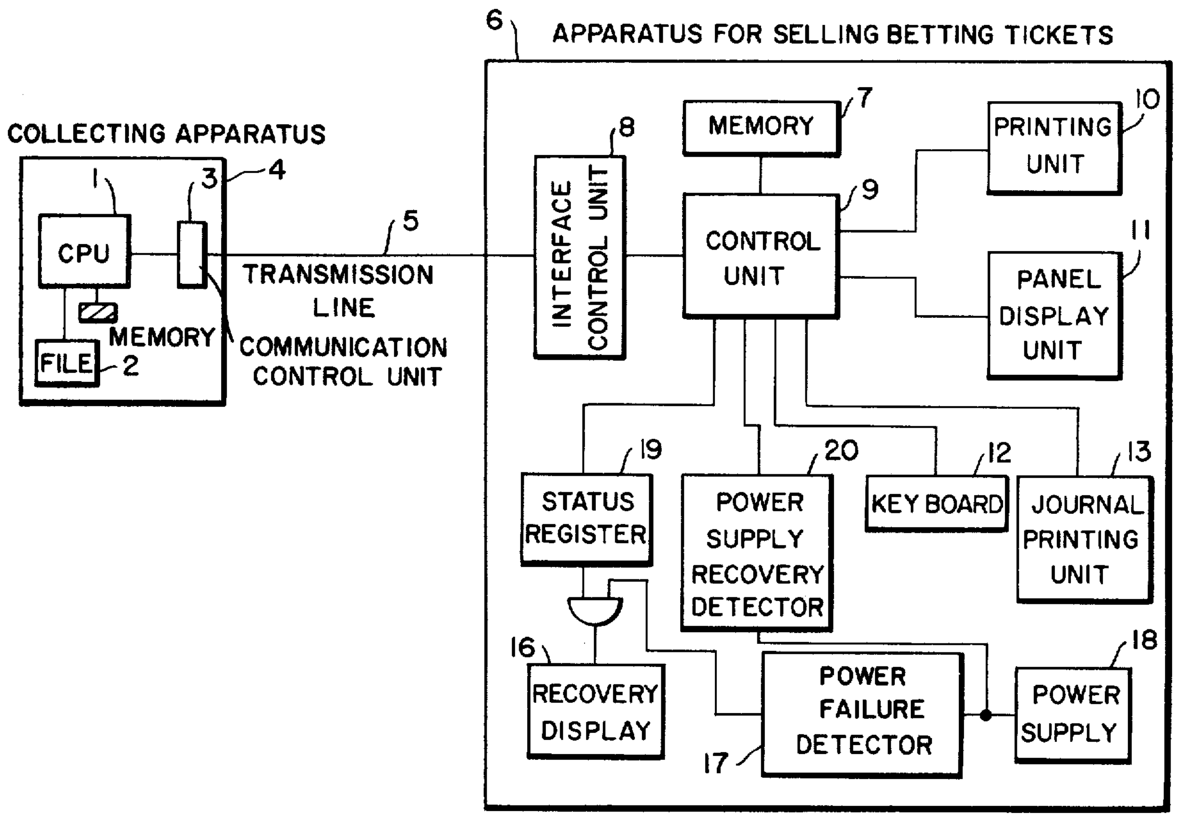
FIG. 6 is the block diagram of an apparatus for selling betting tickets according to a 2nd embodiment of the present invention.

FIG. 6 shows the block diagram of the apparatus for selling betting tickets according to the 2nd embodiment of the present invention. In this figure, 20 is the power supply recovery detector. Other parts given the same numbering as FIG. 3 respectively correspond to those of FIG. 3.

In the 1st embodiment mentioned above, when the operator depresses the latest ticket selling data request key 14 after recovery of power supply, the latest ticket selling data request signal is sent to the collecting apparatus. However if the operator forgets to depress the latest ticket selling data request key 14 and a ticket is sold when power failure recovers, contents of the latest ticket selling data memory 15 of the collecting apparatus 4 are updated and the data being stored at the moment of occurrence of power failure is destroyed.

Thus, in the 2nd embodiment, the latest ticket selling data request signal is sent to the collecting apparatus automatically when the power switch is turned ON at the apparatus for selling betting tickets after restoration of power.

Figure 7:
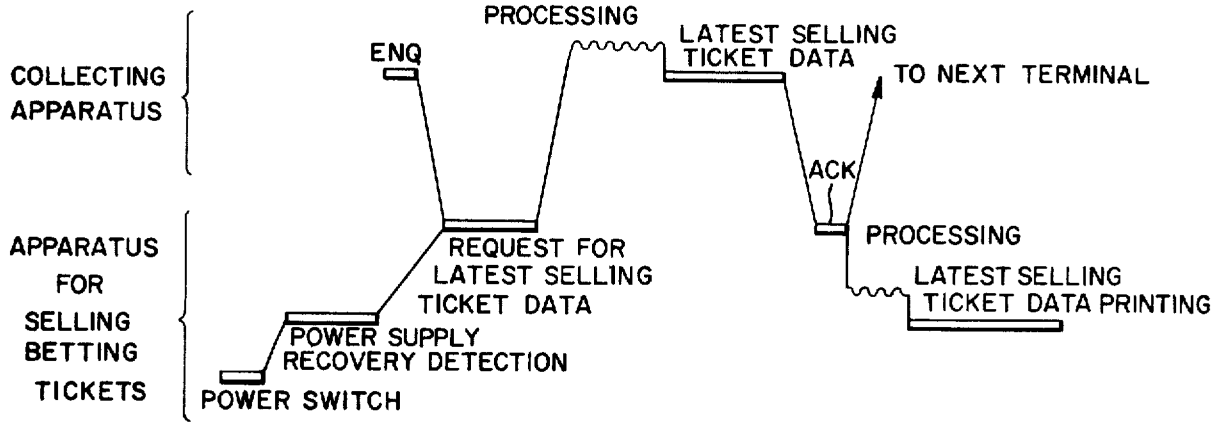
FIG. 7 is a time chart indicating the data transfer sequence between the collecting apparatus and the apparatus for selling betting tickets shown in FIG. 6.

In FIG. 6, when the power supply recovery detector 20 detects restoration of power after the power failure detector 17 detects power failure, the recovery signal is sent to the control unit 9 and it is converted therein to the latest ticket selling data request signal and then sent automatically to the collecting apparatus 4 as shown in the time chart of FIG. 7.

According to the processing system of the present invention, as explained above, an operator can obtain accurate data to be subtracted when power is restored and therefore the difference between the file contents and the actual number of tickets sold disappears, thus resulting in improved system reliability.

What is claimed is:

1. A processing system for use in a betting tickets selling and collecting system when a power failure occurs, said betting tickets selling and collecting system including a plurality of apparatuses for selling betting tickets comprising an input unit for inputting betting information and a ticket issuing unit for issuing tickets in accordance with said betting information and a collecting apparatus operatively connected to said plurality of apparatuses for selling betting tickets, said collecting apparatus comprising a collecting file which is updated by receiving said betting information and means for sending ticket selling command data to said plurality of apparatuses for selling betting tickets, thereby causing said plurality of apparatuses for selling betting tickets to issue the betting tickets, wherein the improvement comprises:

a storage means, included in said collecting apparatus for storing the latest selling ticket data for each apparatus for selling betting tickets; and means, included in each of said plurality of apparatuses for selling betting tickets, for sending a message to said collecting apparatus after a power failure has occurred at one of said plurality of apparatuses for selling betting tickets and power has been restored, wherein said message is a request for the stored latest selling ticket data for the particular apparatus for selling betting tickets.

2. A processing system as set forth in claim 1, wherein said means for sending a message is a latest selling ticket data request key provided at each of the plurality of apparatuses for selling betting tickets.

3. A processing system as set forth in claim 1, wherein said means for sending a message is a power supply detector for detecting that the power switch of the apparatus for selling betting tickets is turned ON after the power supply recovers.

4. A betting ticket selling and collecting system, having means for connection to a power supply, comprising:

a ticket selling apparatus for providing a ticket request signal and a latest data request signal; and a collecting apparatus, operatively connected to said ticket selling apparatus, for providing a ticket selling command signal in dependence upon said ticket request signal, and for providing a latest ticket data signal in dependence upon said latest data request signal, wherein said ticket selling apparatus comprises:

input means for inputting ticket information and for providing said ticket request signal;

power failure detector means, operatively connected to the means for connection to a power supply, for detecting a loss of power and for providing a power failure signal;

recovery means for providing a recovery signal when power is restored;

control unit means, operatively connected to said recovery means, said input means and said collecting apparatus, for receiving said recovery signal, said ticket request signal, said ticket selling command signal, and said latest ticket data signal and for providing as outputs said latest data request signal, said ticket request signal on said latest ticket data signal;

display means, operatively connected to said control unit means, for receiving said latest ticket data signal and for displaying information representing said latest ticket data signal, and wherein said collecting apparatus comprises:

a central processing unit, operatively connected to said control unit means, for receiving said ticket request signal and said latest data request signal and for providing as outputs said ticket selling command signal, said latest ticket data signal, and an update signal;

collecting file means, operatively connected to said central processing unit, for receiving said update signal and for storing ticket selling information;

a memory means, operatively connected to said central processing unit, for storing latest ticket selling data and for providing said latest ticket data signal to said central processing unit, whereby an operator of said ticket selling apparatus can determine whether or not said latest ticket selling data has been placed in said collecting file by viewing said display means.

5. A betting ticket selling and collecting system as set forth in claim 4, wherein said ticket selling apparatus further comprises:

a status register, operatively connected to said control unit means, for storing the present operating status of the ticket selling apparatus and for providing a status signal; and a recovery display unit means, operatively connected to said status register and said power failure detector means, for displaying said status signal when said power failure signal is present.

6. A betting ticket selling and collecting system as set forth in claim 4 or 5, wherein said recovery means comprises a latest selling ticket data request key which is selectively depressable to provide said recovery signal.

7. A betting ticket selling and collecting system as set forth in claim 4 or 5, wherein said recovery means comprises power supply recovery detector means for providing said recovery signal when power is restored.

8. A betting ticket selling and collecting system as set forth in claim 4, comprising at least two ticket selling apparatuses operatively connected to said collecting apparatus and wherein said memory means provides separate storage for the latest ticket data information corresponding to each ticket selling apparatus.

* * * * *

UNITED STATES PATENT AND TRADEMARK OFFICE
CERTIFICATE OF CORRECTION

PATENT NO. : 4,275,456

DATED : June 23, 1981

INVENTOR(S) : Takehiko Tanaka et al.

It is certified that error appears in the above—identified patent and that said Letters Patent is hereby corrected as shown below:

Front Page, [73] Assignee, "Tokyo," should be --Kawasaki,--;
[57] Abstract, line 3, "apparatus" should be --apparatuses--.
Col. 1, line 48, "totalization" should be --totalizator--;
line 49, "can not" should be --cannot--.
Col. 2, line 47, after "been" insert --no--;
line 53, "operations" should be --operation--.
Col. 3, line 48, before "tl" insert --The time--;
line 63, "condition:" should be --conditions:--.
Col. 4, line 16, after "of" insert --performing--.
Col. 7, line 41, "on" should be --and--.
Col. 8, line 15, "," should be --.--;
delete lines 16-19;
line 30, "." should be --, whereby an operator of the ticket selling apparatus can determine whether or not the latest ticket selling data has been placed in the collecting file means by viewing said recovery display unit means.--.

Signed and Sealed this

*Fifteenth* Day of *December 1981*

|SEAL|

*Attest:*

GERALD J. MOSSINGHOFF

*Attesting Officer* *Commissioner of Patents and Trademarks*